United States Patent
Kucherenko et al.

(10) Patent No.: US 11,560,791 B2
(45) Date of Patent: Jan. 24, 2023

(54) ELECTROMAGNETIC TELEMETRY TRANSMITTER APPARATUS AND MUD PULSE-ELECTROMAGNETIC TELEMETRY ASSEMBLY

(71) Applicant: MWDPlanet and Lumen Corporation, Calgary (CA)

(72) Inventors: Borys Kucherenko, Calgary (CA); Mariya Kucherenko, Calgary (CA); Derek Belle, Calgary (CA)

(73) Assignee: MWDPlanet and Lumen Corporation, Rocky View (CA)

( * ) Notice: Subject to any disclaimer, the term of this patent is extended or adjusted under 35 U.S.C. 154(b) by 40 days.

(21) Appl. No.: 16/771,894

(22) PCT Filed: Dec. 12, 2018

(86) PCT No.: PCT/CA2018/051583
§ 371 (c)(1),
(2) Date: Jun. 11, 2020

(87) PCT Pub. No.: WO2019/113694
PCT Pub. Date: Jun. 20, 2019

(65) Prior Publication Data
US 2021/0140308 A1    May 13, 2021

Related U.S. Application Data

(60) Provisional application No. 62/598,192, filed on Dec. 13, 2017.

(51) Int. Cl.
*H04L 27/02*    (2006.01)
*E21B 47/13*    (2012.01)
(Continued)

(52) U.S. Cl.
CPC .............. *E21B 47/13* (2020.05); *E21B 21/08* (2013.01); *E21B 47/18* (2013.01); *H04L 25/028* (2013.01);
(Continued)

(58) Field of Classification Search
CPC .................................. E21B 47/00; E21B 47/13
See application file for complete search history.

(56) References Cited

U.S. PATENT DOCUMENTS

| | | |
|---|---|---|
| 4,057,781 A | 11/1977 | Scherbatskoy |
| 4,739,325 A | 4/1988 | MacLeod |

(Continued)

FOREIGN PATENT DOCUMENTS

| | | |
|---|---|---|
| CA | 2325115 A1 | 5/2001 |
| CA | 2783053 C | 9/2006 |

(Continued)

OTHER PUBLICATIONS

International Search Report dated Mar. 14, 2019, 3 pages (Corresponding PCT Publication WO 2019113694).

(Continued)

*Primary Examiner* — Qutbuddin Ghulamali
(74) *Attorney, Agent, or Firm* — MBM Intellectual Property Law LLP

(57) ABSTRACT

A unified mud-pulse (MP)-electromagnetic (EM) telemetry assembly and a downhole telemetry tool are provided including a downhole EM telemetry transmitter apparatus. The EM telemetry transmitter apparatus comprises a modulator configured to transmit at least one EM signal through transmission medium. The modulator comprises a first reactive circuit and a second reactive circuit, and a plurality of switches controlled by a controller to alternatingly switch the modulator between a first configuration and a second configuration. The EM signals are transmitted by passing (Continued)

one of the reactive circuits and bypassing the other reactive circuit.

19 Claims, 9 Drawing Sheets

(51) Int. Cl.
| | | |
|---|---|---|
| *E21B 21/08* | (2006.01) | |
| *E21B 47/18* | (2012.01) | |
| *H04L 25/02* | (2006.01) | |
| *H04L 27/10* | (2006.01) | |
| *H04L 27/18* | (2006.01) | |
| *H04L 27/34* | (2006.01) | |
| *E21B 47/0228* | (2012.01) | |
| *E21B 47/07* | (2012.01) | |
| *E21B 47/06* | (2012.01) | |
| *E21B 49/00* | (2006.01) | |

(52) U.S. Cl.
CPC .............. *H04L 27/02* (2013.01); *H04L 27/10* (2013.01); *H04L 27/18* (2013.01); *H04L 27/34* (2013.01); *E21B 47/0228* (2020.05); *E21B 47/06* (2013.01); *E21B 47/07* (2020.05); *E21B 49/00* (2013.01)

(56) References Cited

U.S. PATENT DOCUMENTS

| | | | |
|---|---|---|---|
| 4,908,804 A | 3/1990 | Rorden | |
| 5,477,923 A | 12/1995 | Jordan, Jr. et al. | |
| 5,490,121 A | 2/1996 | Gardner et al. | |
| 5,517,464 A * | 5/1996 | Lerner | E21B 41/0085 |
| | | | 340/854.3 |
| 6,308,137 B1 | 10/2001 | Underhill et al. | |
| 6,823,265 B2 | 11/2004 | Haldorsen | |
| 6,909,667 B2 | 6/2005 | Shah et al. | |
| 7,377,333 B1 | 5/2008 | Sugiura | |
| 7,573,397 B2 * | 8/2009 | Petrovic | E21B 47/24 |
| | | | 340/854.6 |
| 7,894,302 B2 | 2/2011 | Mello et al. | |
| 7,913,773 B2 | 3/2011 | Li et al. | |
| 8,120,509 B2 | 2/2012 | Young | |
| 8,154,420 B2 | 4/2012 | Petrovic et al. | |
| 8,164,476 B2 | 4/2012 | Hache et al. | |
| 8,228,691 B2 | 7/2012 | Mueller | |
| 8,436,709 B2 | 7/2013 | Fouquet et al. | |
| 8,502,696 B2 | 8/2013 | Clark | |
| 9,091,154 B2 | 7/2015 | Weerasinghe et al. | |
| 9,109,439 B2 | 8/2015 | Hache et al. | |
| 9,284,834 B2 | 3/2016 | Alteirac et al. | |
| 9,291,049 B2 | 3/2016 | Switzer et al. | |
| 9,435,196 B2 | 9/2016 | Switzer et al. | |
| 9,482,085 B2 | 11/2016 | Petrovic et al. | |
| 9,590,516 B2 | 3/2017 | Biebach et al. | |
| 9,605,535 B2 | 3/2017 | Logan et al. | |
| 9,631,484 B2 | 4/2017 | Rozenblit et al. | |
| 9,632,203 B2 | 4/2017 | Hopper et al. | |
| 9,664,037 B2 | 5/2017 | Logan et al. | |
| 10,066,481 B2 | 9/2018 | Switzer et al. | |
| 2005/0219040 A1 * | 10/2005 | Dryer | G08B 3/10 |
| | | | 340/384.6 |
| 2007/0017671 A1 | 1/2007 | Clark et al. | |
| 2007/0054006 A1 | 3/2007 | Pierson et al. | |
| 2013/0234859 A1 | 9/2013 | Picioreanu et al. | |
| 2014/0266769 A1 | 9/2014 | van Zelm | |
| 2015/0256227 A1 | 9/2015 | Teggatz et al. | |
| 2015/0345283 A1 * | 12/2015 | Switzer | E21B 47/024 |
| | | | 73/152.54 |
| 2016/0369622 A1 | 12/2016 | Wheeler et al. | |
| 2017/0009570 A1 | 1/2017 | Petrovic et al. | |
| 2017/0133948 A1 | 5/2017 | Kanou et al. | |
| 2017/0145816 A1 | 5/2017 | Pabon et al. | |

FOREIGN PATENT DOCUMENTS

| | | |
|---|---|---|
| CA | 2593416 C | 6/2008 |
| CN | 103498667 B | 1/2014 |
| CN | 203872719 U | 10/2014 |
| CN | 104271880 A | 1/2015 |
| CN | 105008662 A | 10/2015 |
| CN | 105637353 A | 6/2016 |
| WO | 2014127482 A1 | 8/2014 |
| WO | 2015192226 A1 | 12/2015 |
| WO | 2015196277 A1 | 12/2015 |
| WO | 2016095027 A1 | 6/2016 |
| WO | 2016193017 A1 | 12/2016 |
| WO | 2017069753 A1 | 4/2017 |
| WO | 2019113694 A1 | 6/2019 |

OTHER PUBLICATIONS

Written Opinion dated Mar. 14, 2019, 5 pages (Corresponding PCT Publication WO 2019113694).
Office Action for Chinese Application No. 201880079208.3 (Publication No. 111448764A); dated Aug. 12, 2021, 10 pages.

* cited by examiner

ELECTROMAGNETIC TELEMETRY TRANSMITTER APPARATUS AND MUD PULSE-ELECTROMAGNETIC TELEMETRY ASSEMBLY

CROSS REFERENCE TO RELATED APPLICATIONS

This application is the National Stage of International Application No. PCT/CA2018/051583, filed on Dec. 12, 2018, which claims priority to U.S. Provisional Application No. 62/598,192, filed on Dec. 13, 2017, the contents of both prior applications being hereby incorporated by reference in their entirety.

FIELD OF THE INVENTION

The present invention generally relates to a downhole telemetry system and in particular to electromagnetic (EM) telemetry transmitter apparatus, and a mud-pulse (MP) and EM telemetry assembly employing the EM transmitter in downhole telemetry technology.

BACKGROUND

The recovery of hydrocarbons involves drilling wellbores that can reach depths of thousands of kilometers. Wellbore drilling operations require drilling rig equipment located at the surface, a drill string comprising of drill pipes attached lengthwise, and a hydraulic motor that powers a drill bit. The hydraulic motor and drill bit are part of the Bottom-Hole-Assembly (BHA) which is attached to the downhole side of the drill string. Drilling fluid (often termed "mud") is pumped from the surface through the drill string, powering the hydraulic motor (hence, mud motor). The mud then exits through drill bit nozzles and carries the cuttings through the annulus (space between the exterior of the drill string and the wellbore) up to the surface. The mud cools and lubricates the drill bit and controls the wellbore's pressure in order to prevent formations from collapsing into the well.

Directional and horizontal drilling operations involve steering the drill string from the vertical to penetrate the target reservoir at an angle. Real time downhole data is required to accurately follow the wellbore's planned path. Downhole data includes directional data, formation properties data, and downhole conditions data. The downhole data is obtained using Measurement-While-Drilling (MWD) telemetry systems integrated in the BHA. MWD systems measure downhole data using sensors near the drill bit, encode the data, and then transmit the data to the surface via the telemetry system where it is measured and decoded using surface equipment.

Two commonly used telemetry systems in the industry are MP telemetry and EM telemetry. To transmit data using MP telemetry, a flow valve is driven by a mud pulser to momentarily restrict the mud flow through the drill string. This creates pressure pulses in the mud (hence, Mud-Pulses) representing encoded downhole data which are measured at the surface using standpipe pressure sensors. MP telemetry's advantage is that it functions independently of the formations and is generally more deep-drilling reliable than EM telemetry. The disadvantages of MP telemetry are its slower data-transmission rate (up to 1 bit/s) and its dependence on the properties of the mud. It becomes difficult to generate and measure mud pulses effectively if the mud is compressible or contains large amounts of Lost Circulation Materials (LCM). And since the mud is continuously pumped through the drill string, pressure spikes from the mud pump can mask the Mud pulses representing the encoded data. This in combination with a mud pulses' attenuation with increasing wellbore depth can make its detection and decoding impossible.

The data transmission rate for MP telemetry can be increased by reducing the width of the pressure pulses. This is accomplished by restricting the flow of the mud system for shorter periods of time. The disadvantage of this method is that it increases power consumption and makes the mud pulses more susceptible to noise from the mud pump. Decoding reliability can be partially improved by increasing the strength/amplitude of the mud pulse. This can be done by increasing the flow restriction of the drilling mud by blocking a larger percentage of the mud column's cross-sectional area. The disadvantage of this method is that it further restricts mud flow to the drilling motor and can potentially damage the mud circulation system. Another method for improving decoding reliability is to increase the width of the pressure pulse, which is accomplished by restricting the flow of the mud for an increased period. The disadvantage of this method is that slows the data-transmission rate.

To transmit data using EM telemetry, an alternating differential voltage (up to 150V peak-to-peak) is generated across an isolation sub in the BHA, sending a low frequency (0.5-32 Hz) Alternating Current (AC) through the formations and up to the surface. This AC is modulated to carry the encoded data. The alternating differential voltage is measured and decoded at the surface.

EM telemetry is more independent of the mud's properties and has significantly faster data transmission rates which can reach up to 30 bits/s depending on signal frequency and modulation method. A disadvantage of EM telemetry is that it has higher power consumption than MP telemetry. Also, the high voltage outputs (up to 150V peak-to-peak) can damage the electronics in the event of a short-circuit. Furthermore, a fraction of the power consumed by the EM transmitter is wasted as heat due to power inefficiency. Since the systems are operating in a downhole environment that can exceed 200° C., additional waste heat can destroy the electronics. Another disadvantage of EM telemetry is the attenuation of the EM signal. At the surface, EM telemetry receivers must be able to receive, measure, and filter signals as weak as 1 µV (−120 dBV). EM signal attenuation depends on the BHA's configuration (e.g. length and diameter), thickness and electrical properties of the earth's formations, and EM signal reception in dependence of Electro-Magnetic Interference (EMI) generated by drilling equipment and machinery on the surface. Those can include large power generators, pumps, and motors. The combination of signal attenuation and EMI can make measurement and decoding impossible.

The relationship between signal strength and EMI at a certain frequency band can be represented by the Signal-to-Noise ratio (S/N). An EM signal must meet an S/N-threshold to be successfully measured and decoded. One method of increasing S/N is to increase the strength/amplitude of the EM signal. This can be done by increasing the output voltage of the EM-transmitter. The limitation to this method is that it increases power consumption and can generate a significant amount of waste heat due to power inefficiency in the EM transmitter. Output voltages can reach up to 150V (peak-to-peak) and can damage the downhole equipment.

Another solution is to find and switch to a frequency band that has a higher S/N at the surface. To maintain signal integrity, the drilling operator must continuously monitor the EM profile using spectrum graphs to find the optimal frequency channel. Also, switching to a lower frequency band decreases the data transmission rate. Another method to decrease the required S/N threshold for a chosen frequency band is by using a simpler modulation scheme. The disadvantage of this method is that it decreases data transmission rate as well.

In recent years, combined MP and EM telemetry systems have also been developed to switch between a MP mode and an EM mode. U.S. Pat. No. 9,291,049 discloses a downhole MWD telemetry tool comprising a MP telemetry unit and an EM telemetry unit comprising an EM signal generator. The limitation of the combined MP and EM systems currently used in the field is that the EM and MP telemetry units are simply connected ad-hoc. This results in a system that is too long (~40 meters) to assemble then ship to the rig. Such systems must be assembled at the rig which requires an MWD operator on location. Assembling the entire Bottom Hole Assembly (BHA) also takes more time.

Another limitation is that a connector is used to connect the EM telemetry and MP telemetry modules which immediately introduces an additional risk of system failure. Moreover, since the EM and MP systems are independent they each have separate electrical and mechanical components. This presents a greater risk of system. Since the EM and MP telemetry systems function independently, power and data management are not refined.

Therefore, there is a need to overcome one or more limitations in the prior art and to provide an improved telemetry system which would have low power consumption, increased reliability, and a compact, modular, and intelligent assembly.

This background information is provided for the purpose of making known information believed by the applicant to be of possible relevance to the present technology. No admission is necessarily intended, nor should be construed, that any of the preceding information constitutes prior art against the present technology.

SUMMARY OF INVENTION

An object of the present invention is to provide an improved electromagnetic telemetry transmitter apparatus and a unified modular-design and intelligent mud pulse-electromagnetic telemetry assembly employing same.

In accordance with an aspect of the invention, there is provided an EM telemetry transmitter apparatus comprising a power supply, a controller and a modulator configured to receive direct current (DC) from the power supply and to receive controlling commands from the controller. The modulator is further configured to transmit at least one EM signal in response to the controlling commands. The at least one EM signal is transmitted between a surface location and an underground location or between the underground location and another underground location. The modulator comprises a first reactive circuit and a second reactive circuit, a first output terminal and a second output terminal for direct or inductive connection to transmission medium at separate, spaced-apart locations. A plurality of switches is configured to alternatingly switch the modulator between a first configuration and a second configuration. In the first configuration, an input of the first reactive circuit is at least intermittently connected to the power supply. An output of the first reactive circuit is connected to the first output terminal, and the second output terminal is connected to an electrical return path which bypasses the second reactive circuit. In the second configuration, an input of the second reactive circuit is at least intermittently connected to the power supply. An output of the second reactive circuit is connected to the second output terminal, and the first output terminal is connected to another electrical return path which bypasses the first reactive circuit. In accordance with another aspect of the present invention, there is provided a unified mud-pulse (MP)-electromagnetic (EM) telemetry assembly comprising the EM transmitter apparatus as described above.

In accordance with another aspect of the present invention, there is provided a downhole telemetry tool comprising a unified MP-EM telemetry assembly comprising the EM transmitter apparatus as described above.

BRIEF DESCRIPTION OF THE FIGURES

Further features and advantages of the present invention will become apparent from the following detailed description, taken in combination with the appended drawings, in which.

DETAILED DESCRIPTION

Figure 1:
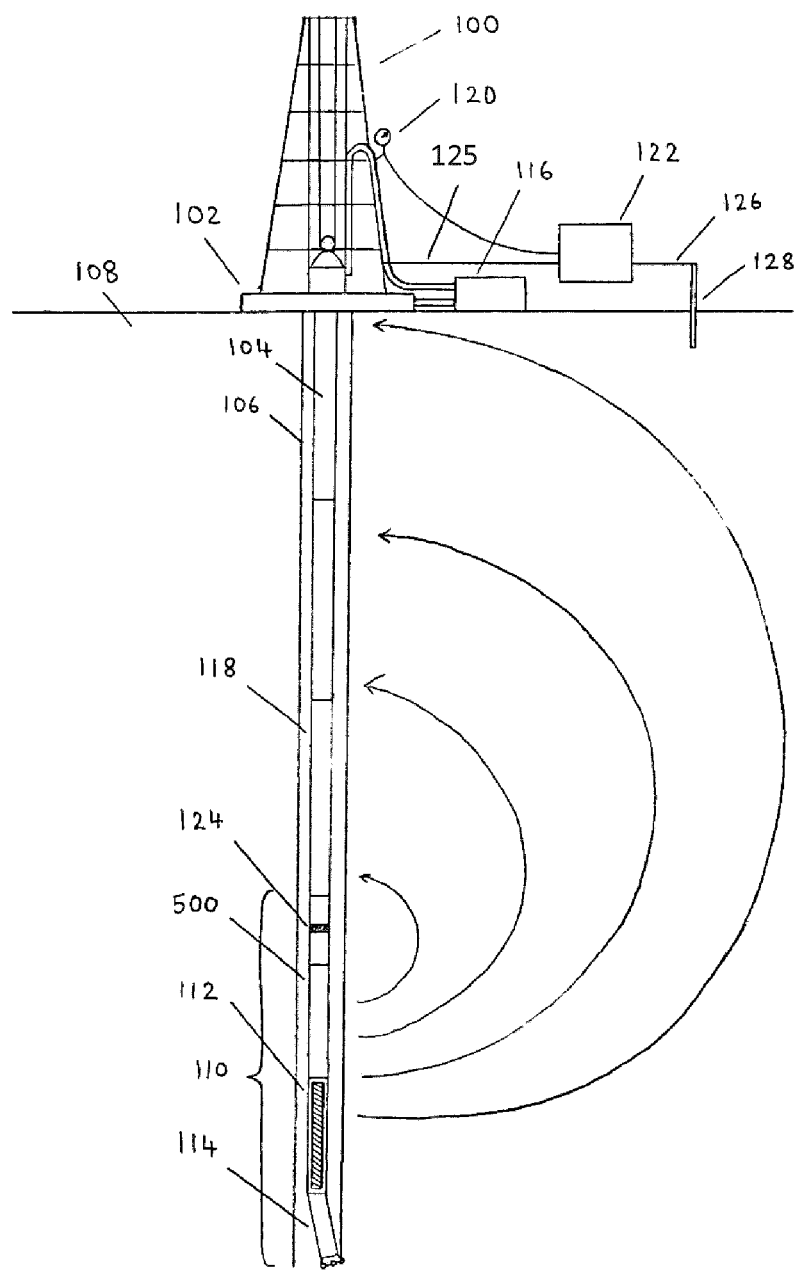
FIG. 1 is a schematic drawing of an exemplary drilling system using MP-EM telemetry assembly according to one embodiment of the invention.

The present invention provides an electromagnetic (EM) telemetry transmitter apparatus, a unified modular design mud pulse-electromagnetic telemetry assembly and a downhole telemetry tool employing same.

The EM telemetry transmitter apparatus of the present invention comprises a power supply, a controller and a modulator configured to receive direct current (DC) from the power supply and to receive controlling commands from the controller. The modulator is further configured to transmit at least one EM signal in response to the controlling commands. The at least one EM signal is transmitted between a surface location and an underground location or between the underground location and another underground location. The modulator comprises a first reactive circuit and a second reactive circuit, a first output terminal and a second output terminal for direct or inductive connection to a signal transmission medium at separate, spaced-apart locations. Non-limiting examples of the transmission medium include earth, other types of formation, or fluid. A plurality of switches is configured to alternatingly switch the modulator between a first configuration and a second configuration. In the first configuration, an input of the first reactive circuit is at least intermittently connected to the power supply. An output of the first reactive circuit is connected to the first output terminal, and the second output terminal is connected to an electrical return path which bypasses the second reactive circuit. In the second configuration, an input of the second reactive circuit is at least intermittently connected to the power supply. An output of the second reactive circuit is connected to the second output terminal, and the first output terminal is connected to another electrical return path which bypasses the first reactive circuit.

In some embodiments, each of the first reactive circuit and the second reactive circuit of the modulator comprises at least one inductor, at least one capacitor, or at least one inductor and at least one capacitor.

In some embodiments, the plurality of switches comprise a first switch connecting the power supply to the input of the first reactive circuit, a second switch connecting virtual ground to the input of the first reactive circuit, a third switch connecting the output of the first reactive circuit and the first output terminal to virtual ground, a fourth switch connecting the power supply to the input of the second reactive circuit, a fifth switch connecting virtual ground to the input of the second reactive circuit, and a sixth switch connecting the output of the second reactive circuit and second output terminal to virtual ground. Each switch has a respective switching duty cycle. The switching duty cycle of a switch is the fraction of the switching period during which it is closed.

In some embodiments, the first configuration is configured to complimentarily switch the first switch and the second switch, such that only one of the first switch and the second switch is closed at a time. In some embodiments, the second configuration is configured to complimentarily switch the fourth and the fifth switch, such that only one of the fourth switch and the fifth switch is closed at a time.

In some embodiments, the EM signal(s) is modulated to at least one modulated signal having a waveform determined by opening and closing operations of the plurality of switches. In some embodiments, the waveform is configured to approximate one or a combination of a sine waveform, a square waveform, a triangle waveform and a saw tooth waveform.

In some embodiments, EM signal(s) can be modulated according to a modulation scheme. The modulation scheme can be pulse width modulation (PWM), amplitude-shift keying (ASK), frequency-shift keying (FSK), phase-shift keying (PSK) and/or quadrature amplitude modulation (QAM). In some embodiments, at least two modulation schemes can be multiplexed in an amplitude domain, phase domain or a frequency domain.

The power supply of the EM telemetry transmitter apparatus can comprise an isolation circuit to galvanically isolate the modulator. This isolation protects the non-isolated circuitry in the event of catastrophic failure. Furthermore, the modulator is in electrical connection with the external ground used by the drilling rig. The isolation circuit protects the DC bus from EM noise from the drilling rig. This prevents issues with sensitive measurements in the power supply. An additional advantage is that the switching noise generated by the modulator will not affect the battery bus that is powering the rest of the downhole sensors. This ensures accurate measurements of the downhole data.

In the preferred embodiment, the transformer is a planar transformer which has lower leakage inductance (more power efficient), has a smaller profile, and runs cooler than toroidal transformers.

According to another object of the present invention, there is provided a unified modular/intelligent design MP-EM telemetry assembly comprising a sub separated by a first insulator into a first part and a second part, a mechanical section and an electronics section. The mechanical section and the electronics section are located within the sub and separated by a second insulator. The mechanical section comprises a driving motor and a flow valve. The unified electronics section comprises an EM transmitter apparatus. The unified MP-EM telemetry assembly further comprises a first connector and a second connector. The first connector electronically connects the mechanical section to the first part of the sub and the second connector electronically connects the electronics section to the second part. In various embodiments, a sub may refer to a drill collar.

In some embodiments, the controller of the unified modular/intelligent design MP-EM telemetry assembly is configured to send commands to the driving motor to transmit at least one MP signal through the first connector by controlling the flow valve to alter flow of drilling fluid. In some embodiments, the controller also sends commands to the modulator to transmit at least one EM signal by generating a differential voltage across the first part and the second part of the sub via the first and second connectors. In some embodiments, the first and/or the second (electrical) insulators are made of electrically non-conductive materials. Non-limiting examples of the non-conductive material include ceramic, fiberglass and carbon-fiber.

The present invention also provides a downhole telemetry tool, comprising a unified modular/intelligent design MP-EM telemetry assembly that can be configured at the field by an operator, by attaching/detaching modular mechanical sections of the unified assembly: Option 1—mechanical section of Pulser's Valve is out—means EM telemetry Only; Option 2—Insulation section of Drilling string or Unified Transmitter's Assembly is out—means Hydraulic Pulser Only; Option 3—all above is present means MP/EM all channels of telemetry.

The downhole telemetry tool can be configured to transmit selected downhole data determined by a transmission mode pre-configured in the controller of the unified MP-EM telemetry assembly. The transmission mode can be one of MP mode, EM mode, MP-EM redundant mode and MP-EM dependent mode. Under MP mode, all the selected downhole data is transmitted via at least one MP signal. Under EM mode, all the selected downhole data is transmitted via at least one EM signal. Under MP-EM redundant mode, all the selected downhole data is transmitted via both at least one MP signal and at least one EM signal. Under MP-EM dependent mode, part of the selected downhole data is transmitted via at least one MP signal and the other part of the selected downhole data is transmitted via at least one EM signal. In one embodiment of the invention, directional data is transmitted via at least one EM signal while geo-data and operational data are transmitted via at least one MP signal. Other transmission modes are also possible, for example which use one or a combination of MP and EM signals to transmit downhole data or other relevant configuration or operational data.

In some embodiments, the transmission mode can be reconfigured by a downlink signal transmitted from the surface and received by the telemetry tool at a downhole location. The downlink signal may comprise at least one MP signal and/or at least one EM signal measured by the at least one downhole sensor and read by the controller to reconfigure the transmission mode. The at least one downhole sensors may comprise at least one of accelerometers, magnetometers, gyroscopes, vibration and shock sensors, gamma sensors, resistivity sensors, neutron density sensors, porosity sensor, pressure sensors and temperature sensors.

The downhole telemetry tool can be an MWD telemetry tool or a logging-while-drilling (LWD) telemetry tool.

Further details relating to the apparatus, assembly and tool of the present invention are discussed with references to the figures of the examples.

FIG. 1 shows an example of the drilling system, which can include an EM telemetry transmitter apparatus and a unified MP-EM telemetry assembly according to the present invention. The drilling system includes a derrick 100 with a rig floor 102 to facilitate a drill string 104 to drill a wellbore 106 into the earth 108. A Bottom-Hole-Assembly (BHA) 110 is located at the downhole end of the drill string. The BHA incorporates a mud motor 112 which powers a drill bit 114 and a downhole MWD telemetry system 500 (comprising the unified MP-EM telemetry assembly and EM telemetry transmitter according to the present invention). Mud is pumped through the drill string by a mud system 116 to power the mud motor and drive the drill bit. The mud exits through nozzles in the drill bit and flows through the annulus 118 and back into the mud system where it is recycled. To transmit a mud pulse signal, the MWD telemetry system generates pressure pulses in the mud which are measured by a standpipe pressure sensor 120 located at the surface. The pressure pulses measured by the standpipe pressure sensor are then decoded by a surface receiver 122. To transmit an electro-magnetic signal, the MWD system generates an alternating voltage differential across the BHA and the drill string which are separated by an insulative sub 124. This sends an alternating current through the formations. The surface receiver measures the alternating differential voltage via a first cable 125 connecting the surface receiver 122 to the drill string and a second cable 126 connecting the surface receiver 122 to a conductive stake 128 penetrating the earth. It is understood that the surface receiver is in electrical communication with the BHA and the drill string.

EM Telemetry Transmitter

Figure 2:
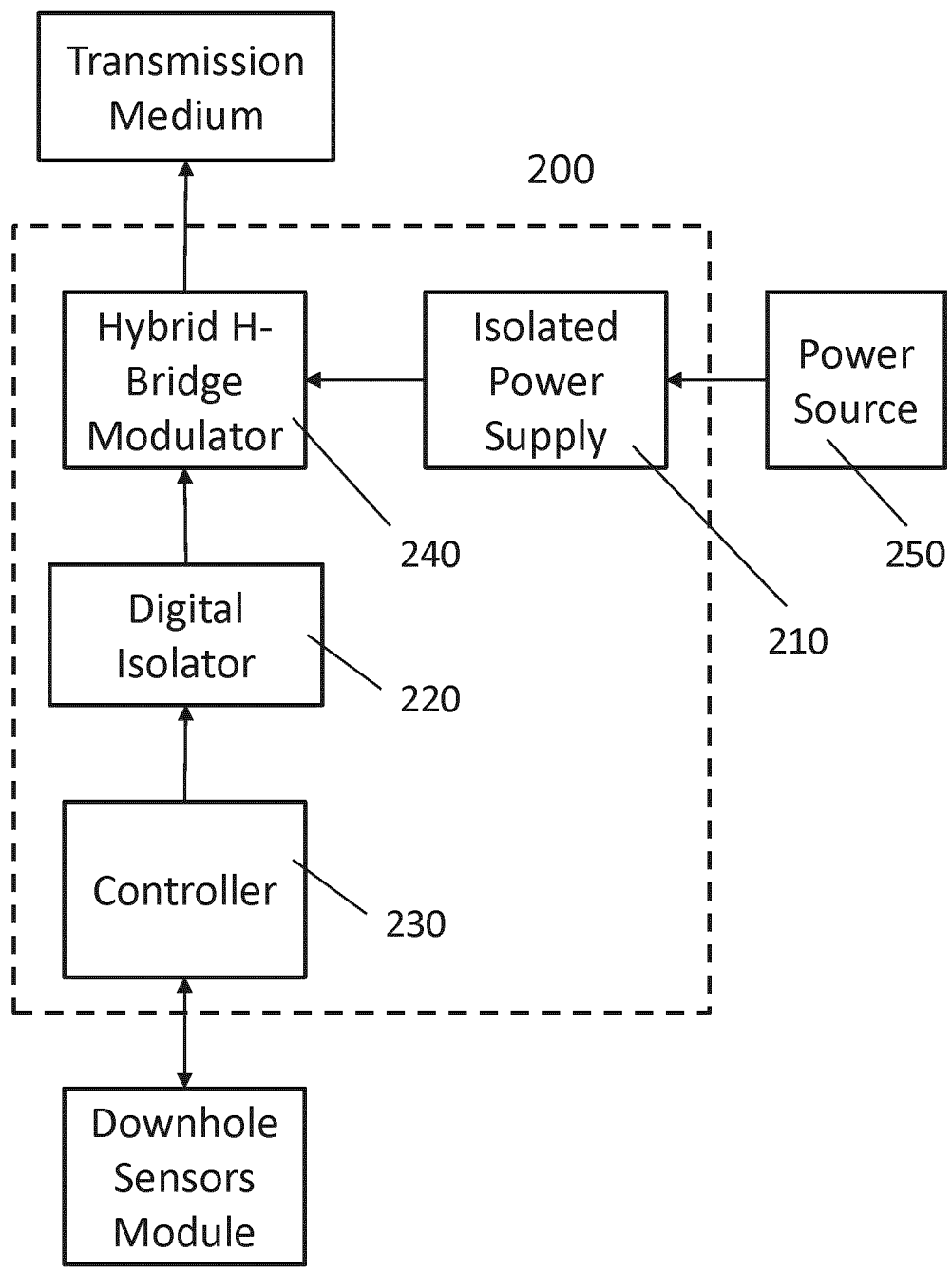
FIG. 2 is a schematic block diagram of an EM telemetry transmitter of the MP-EM telemetry assembly according to one embodiment of the invention.

FIG. 2 shows an example of the EM part of telemetry transmitter 200 according to an embodiment of the present invention. The EM telemetry transmitter 200 includes an isolated power supply 210, a controller 230, a digital isolator 220, and a modulator 240. The power source 250 provides DC power to the isolated power supply 210 which provides isolated DC power to the modulator 240. It is understood that the modulator 240 is galvanically isolated from the rest of the EM telemetry transmitter. To transmit an EM signal carrying downhole data, the controller retrieves or receives downhole data from the downhole sensor modules then encodes the data. The controller 230 then sends a digital command signal through the digital isolator 220 and to the modulator. In response to the digital command signal, the modulator 240 converts the isolated DC power supplied by the isolated power supply to an AC signal representing the encoded downhole data. The AC signal is transmitted through the transmission medium via direct or inductive connection with the transmission medium.

Figure 3A:
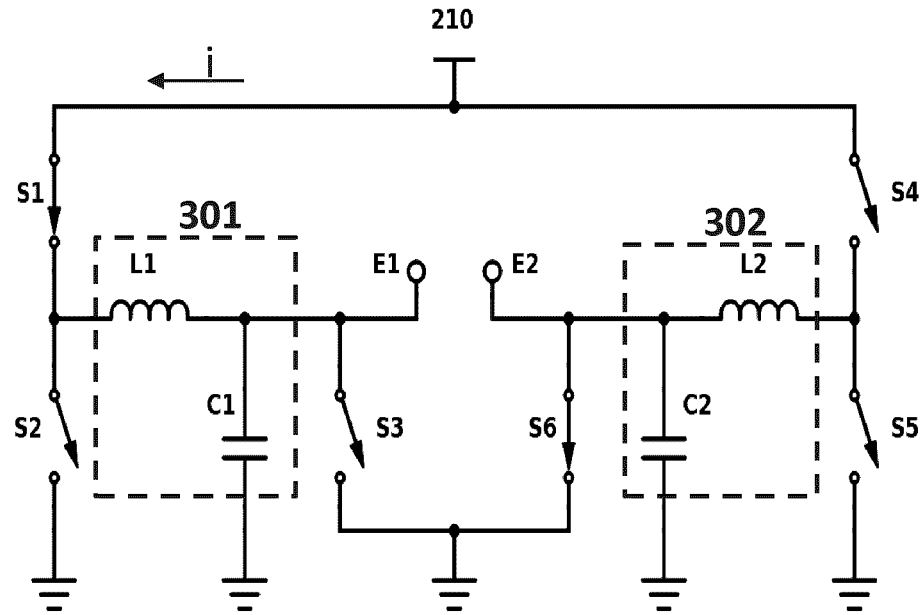
FIGS. 3A and 3B show circuit diagrams of a modulator of the EM telemetry transmitter of FIG. 2 under a first configuration.
Figure 3B:
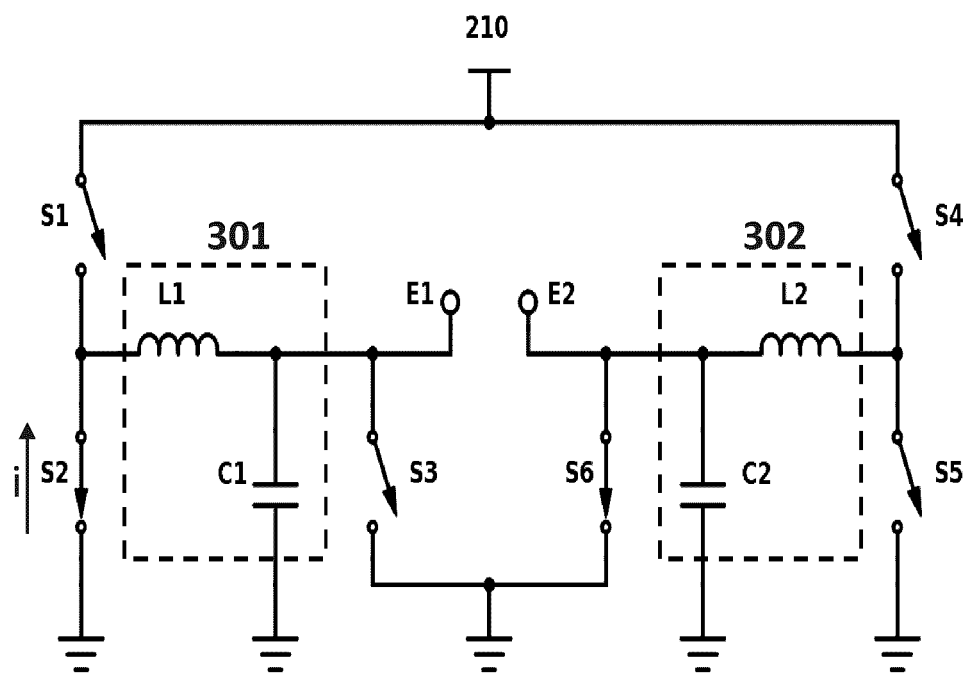

The modulator 240, also referred to as a hybrid H-Bridge circuit shown in FIGS. 3A and 3B, is considered by the inventors to be an improvement based on a conventional H-Bridge circuit. The modulator 240 comprises a first reactive circuit 301 and a second reactive circuit 302. The first reactive circuit comprises inductor L1 and capacitor C1, and the second reactive circuit comprises inductor L2 and capacitor C2. Although only one inductor and one capacitor in each of the reactive circuits are shown in this example, each reactive circuit can have one or more inductors, and one or more capacitors. In some cases, a reactive circuit can include only inductors or only capacitors. As will be readily understood, reactivity refers to the tendency of circuit elements to resist change in electrical voltage or current.

The modulator 240 also includes a first output terminal E1 and a second output terminal E2 for direct or inductive connection to the transmission medium at separate spaced-apart locations.

The modulator 240 further comprises a plurality of switches configured to alternatingly switch the modulator between a first configuration and a second configuration. In the first configuration, the input of the first reactive circuit is at least intermittently connected to the power supply and the output of the first reactive circuit is connected to the first output terminal E1, and the second output terminal E2 is connected to the electrical return path which bypasses the second reactive circuit. In the second configuration, the input of the second reactive circuit is at least intermittently connected to the power supply and the output of the second reactive circuit is connected to the second output terminal E2, and the first output terminal E1 is connected to the electrical return path which bypasses the first reactive circuit.

The plurality of switches include a first switch S1 connecting the power supply to the input of the first reactive circuit, a second switch S2 connecting virtual ground to the input of the first reactive circuit, a third switch S3 connecting the output of the first reactive circuit and the first output terminal to virtual ground, a fourth switch S4 connecting the power supply to the input of the second reactive circuit, a fifth switch S5 connecting virtual ground to the input of the second reactive circuit, and a sixth switch S6 connecting the output of the second reactive circuit and second output terminal to virtual ground. Each switch has a respective switching duty cycle.

FIGS. 3A and 3B illustrate the first configuration, which is configured to complimentarily switch the first switch S1 and the second switch S2, such that only one of the first switch S1 and the second switch S2 is closed at a time. Namely, when the first switch S1 is closed, the second switch S2 is open, and when the second switch S2 is closed, the first switch S1 is open. In this configuration, the sixth switch S6 is kept closed and the third switch S3, fourth switch S4, and fifth switch S5 are kept open. The fifth switch may optionally be closed.

FIG. 3A illustrates the first configuration when the first switch S1 is closed and the second switch S2 is open. The input of the first reactive circuit is connected to the power supply 210 via the first switch S1. The output of the first reactive circuit is connected to the first output terminal E1, and the second output terminal E2 is connected to virtual ground via the sixth switch S6. Current runs through the first reactive circuit and from E1 to E2 through the transmission medium, and bypasses the second reactive circuit.

FIG. 3B illustrates the first configuration where the first switch S1 is open and second switch S2 is closed. The input of the first reactive circuit is connected to virtual ground via the second switch S2. The output of the first reactive circuit is connected to the first output terminal E1, and the second output terminal E2 is connected to virtual ground via the sixth switch S6. Current runs through the first reactive circuit and from E1 to E2 through the transmission medium, and bypasses the second reactive circuit inductor.

The virtual grounds shown in FIGS. 3A, 3B, 5A and 5B can be electrical return paths to the power supply or similar electrical elements providing a stable reference voltage or electrical sink.

Figure 4A:
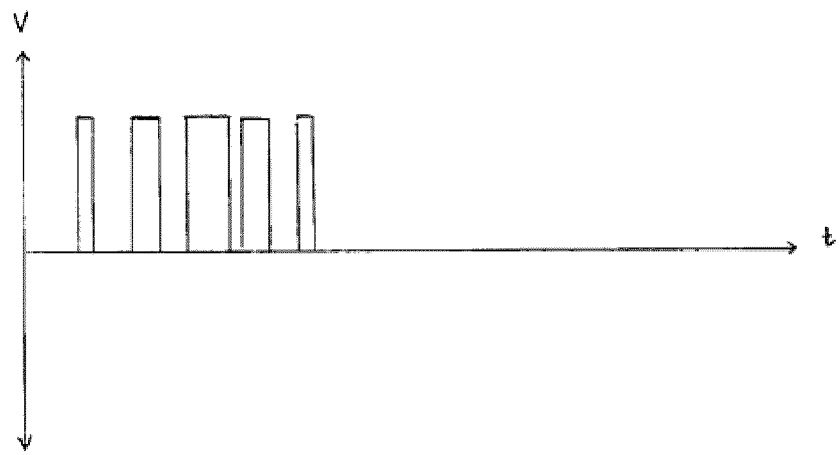
FIG. 4A is a graph illustrating voltage as a function of time at switch S1 of the modulator of FIGS. 3A and 3B.
Figure 4B:
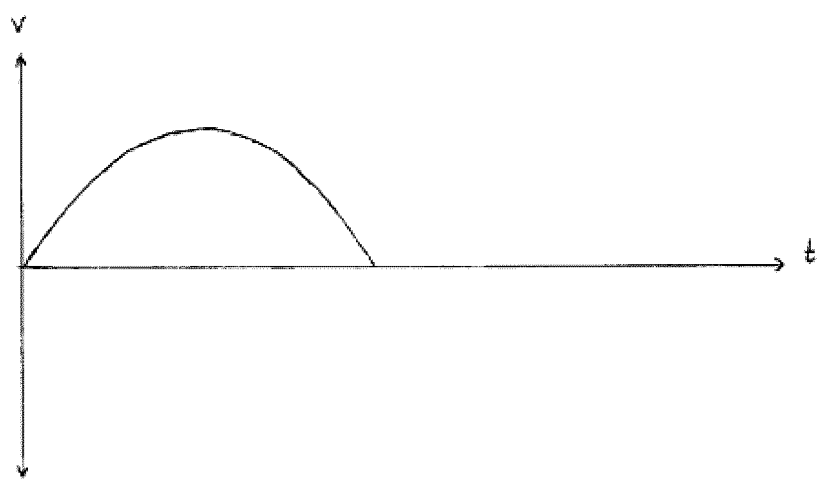
FIG. 4B shows the output voltage of the modulator of FIGS. 3A and 3B.

FIG. 4A illustrates a graph showing the voltage at the first switch S1 as a function of time while the modulator in the first configuration. The switching duty cycle of the first switch S1 is the proportion of time when S1 is closed. FIG. 4B shows the voltage output of the modulator in the first configuration.

Figure 5A:
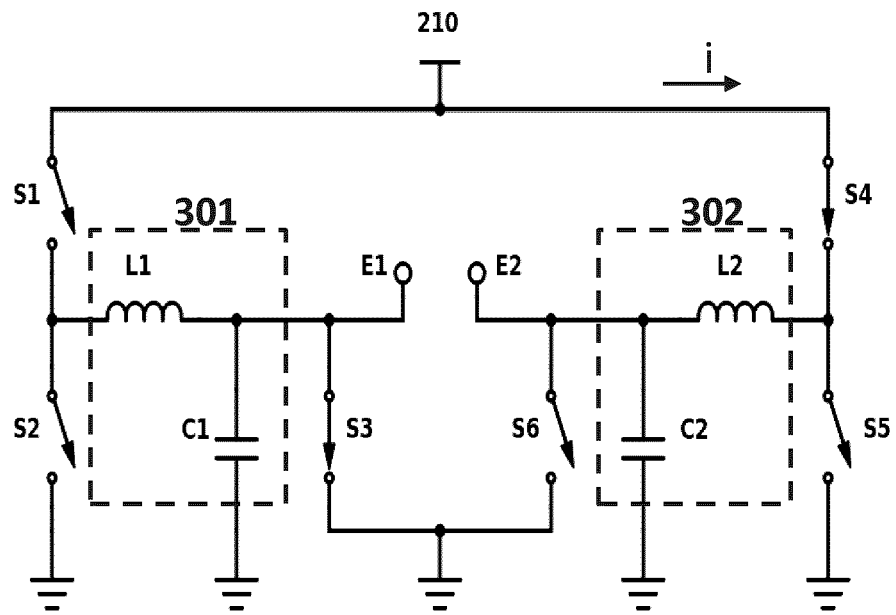
FIGS. 5A and 5B show circuit diagrams of the modulator working under a second configuration.
Figure 5B:
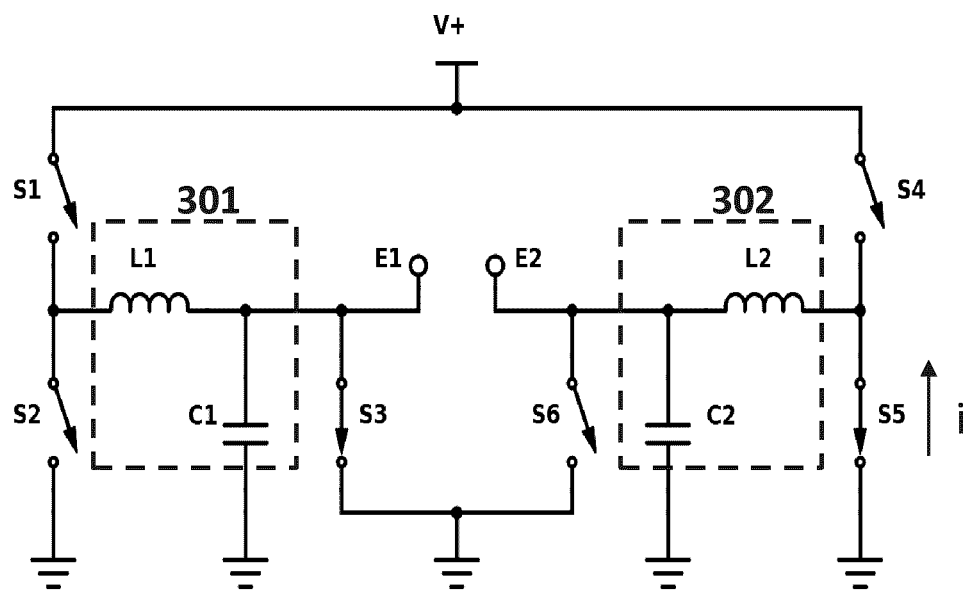

FIGS. 5A and 5B illustrate the second configuration, which is configured to complimentarily switch the fourth switch S4 and the fifth switch S5, such that only one of the fourth switch S4 and the fifth switch S5 is closed at a time. Namely, when the fourth switch S4 is closed, the fifth switch S5 is open, and when the fourth switch S4 is closed, the fifth switch S5 is open. In this configuration, the third switch S3 is kept closed and the first switch S1, second switch S2, and sixth switch S6 are kept open. The second switch may optionally be closed.

FIG. 5A illustrates the second configuration when the fourth switch S4 is closed and fifth switch S5 is open. The input of the second reactive circuit is connected to the power supply 210 via the fourth switch S4. The output of the second reactive circuit is connected to the second output terminal E2, and the first output terminal E1 is connected to virtual ground via the third switch S3. Current runs through the second reactive circuit and from E2 to E1 through the transmission medium, and bypasses the first reactive circuit.

FIG. 5B illustrates the second configuration where the fourth switch S4 is open and fifth switch S5 is closed. The input of the second reactive circuit is connected to virtual ground via the fifth switch S5. The output of the second reactive circuit is connected to the second output terminal E2, and the first output terminal E1 is connected to virtual ground via the third switch S3. Current runs through the second reactive circuit and from E2 to E1 through the transmission medium, and bypasses the first reactive circuit inductor.

Complementary switching refers to a configuration involving two switches, wherein one switch is closed while the other is open and vice-versa. In the present embodiments, S1 and S2 are complimentary switching in the first configuration while S4 and S5 are complimentary switching in the second configuration. In other embodiments, S1 is always closed and S2 is always open while in the first configuration. Similarly, S4 is always closed and S5 is always open while in the second configuration. In such embodiments, the first and second reactive circuits are always connected to the power supply while in the first and second configurations respectively. In some embodiments, the first configuration may further include a state in which both S1 and S2 are both open. Similarly, the second configuration may further include a state in which both S4 and S5 are both open while in the second configuration.

It should be noted that the switches in the above embodiments can be any appropriate electrical switches that are responsive to control signals, such as periodic "open" and "close" signals. Such switches can include relays, transistor-based switches, or electro-mechanical switches. In other embodiments, S2 can be replaced with a first diode D1 and S5 can be replaced with a second diode D5.

Figure 6:
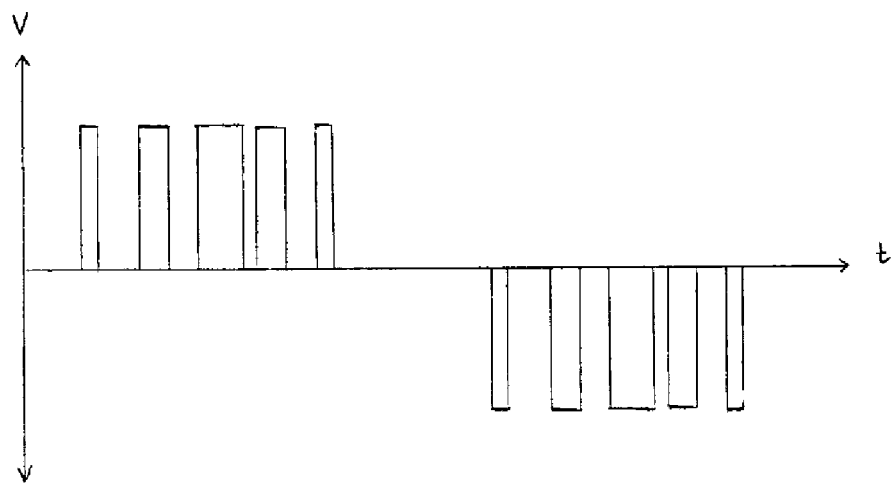
FIG. 6 shows a graph of duty cycles of the first switch S1 and the fourth switch S4 while the modulator is in the first configuration and then the second configuration.

FIG. 6 shows a graph of duty cycles of the first switch S1 and the fourth switch S4. In this embodiment, the switching duty cycle of the first switch S1 is increased and then decreased while in the first configuration, as shown in FIG. 4A, FIG. 4B and FIG. 6 Similarly, the switching duty cycle of the fourth switch S4 is also increased and then decreased while in the second configuration, as shown in FIG. 6. Different shapes of waveforms can be achieved by adjusting the switching duty cycles of the switches. The shape of a waveform is determined by the opening and closing operations of all switches, in particular the switching duty cycle of each switch. In some embodiments, when the pulsed waveforms are passed through the transmission medium, and optionally also through one or more filtering circuits, the shaped waveform becomes discernible as a multi-level waveform rather than a series of pulses. This may be due for example to low-pass or bandpass filtering characteristics.

Figure 7:
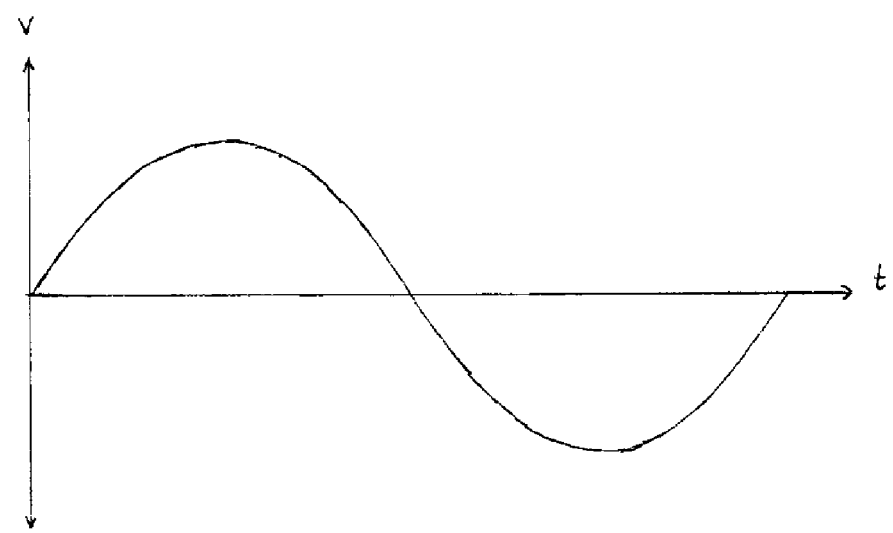
FIG. 7 shows a graph of the output voltage of the modulator under the first configuration and then the second configuration.
Figure 8A:
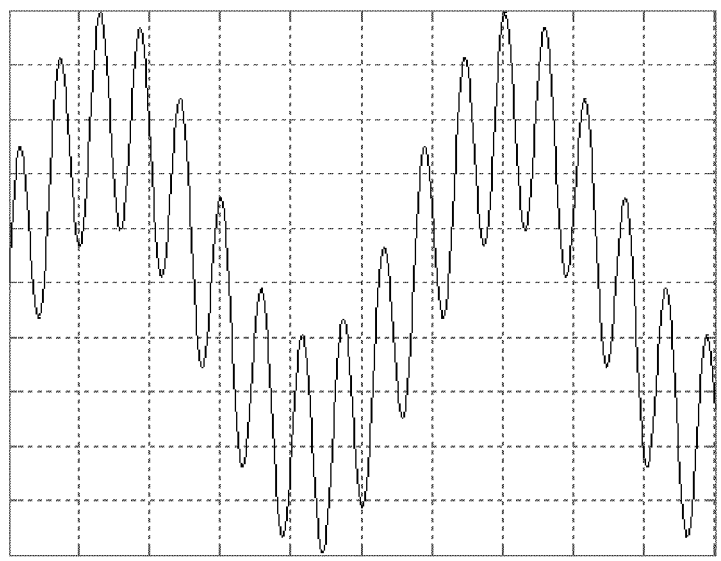
FIGS. 8A and 8B show two modulated signals with different frequencies received at the surface, with FIG. 8A in time domain and FIG. 8B in frequency domain.
Figure 8B:
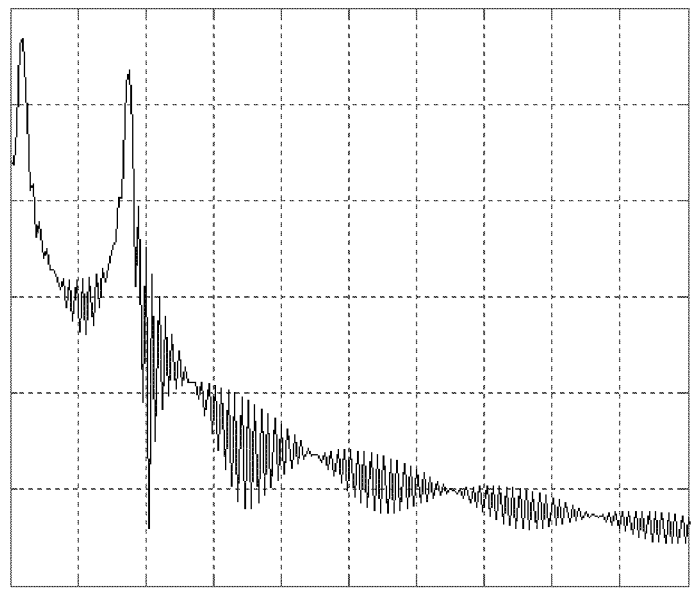

FIG. 7 shows a graph of the output voltage of the modulator under the first configuration and then second configuration. The waveform can be configured to approximate one or a combination of a sine waveform, a square waveform, a triangle waveform and a sawtooth waveform. The waveform may be a modulated waveform carrying information, for example by variation of one or more of: amplitude, phase, and frequency. FIGS. 8A and 8B show two modulated signals with different frequencies received at the surface, with FIG. 8A in time domain and FIG. 8B in frequency domain.

Additionally or alternatively, the modulator can modulate EM signals according to a modulation scheme. The modulation scheme can be one of pulse width modulation (PWM), amplitude-shift keying (ASK), frequency-shift keying (FSK), phase-shift keying (PSK) and quadrature amplitude modulation (QAM). At least two modulation schemes can be multiplexed in one of an amplitude domain, a phase domain and a frequency domain.

In this modulator design, the inductors L1 and L2 have resistances DCR1 and DCR2, respectively. The resistances cause a power loss that can be represented by the following equations:

$$P_{loss} = I_{out}^2 * DCR_1 \text{ (positive direction)}$$

$$P_{loss} = I_{out}^2 * DCR_2 \text{ (negative direction)}$$

The power loss of this modulator is significantly reduced by passing through only one reactive circuit and bypassing the other reactive circuit. The increase in power efficiency allows smaller or more compact design due to lower heat generated, or increased output power. In the design of the invention, high efficiencies (>95%) and high output currents (>20 A) are achieved. Due to the increase in efficiency, stronger signals can be generated to overcome the signal attenuation problem more easily.

During operation, and in some embodiments, the outputs of the electrical signals of the EM telemetry transmitter 200 can reach up to 150V, and the modulator is in electrical connection with the rest of the EM telemetry transmitter and the entire downhole telemetry assembly through the drill string 104. The whole drilling system including downhole and surface components is at risk that such a strong electrical signal can short-circuit the electronics and cause critical failure. The risk of short-circuit can be greatly reduced by galvanically isolating the modulator 240 with the power source from the batteries through the isolated power supply 210, such as using the planar transformer 220.

Although a planar transformer has been used in this embodiment because it is compact and efficient, other types of transformers such as a toroidal transformer can be considered without departing the spirit of the invention.

Although the EM telemetry transmitter in this embodiment has been used to transmit EM signals from an underground location to a surface location through earth, it can be used to transmit EM signals between an underground location and another underground location through other transmission mediums such as other types of formation or fluid.

Unified MP-EM Telemetry Assembly

Figure 9:
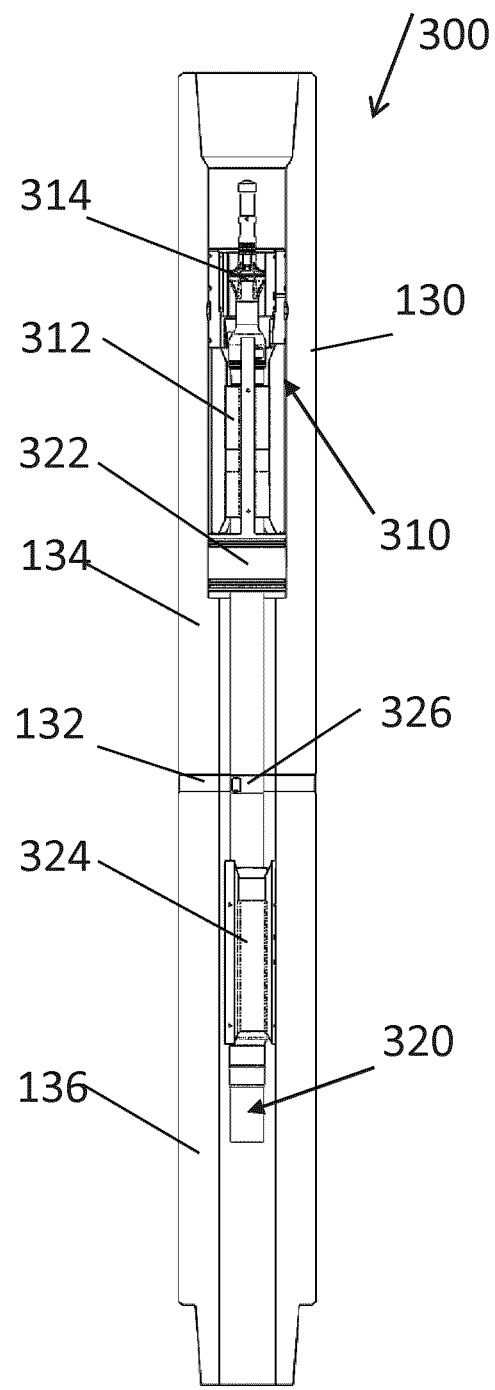
FIG. 9 is a cross-sectional view of the MP-EM telemetry unified assembly.

The EM telemetry transmitter described above, or another EM transmitter, can be installed into a housing to form a unified MP-EM telemetry assembly. FIG. 9 shows a unified MP-EM telemetry assembly 300 according to one embodiment of the present invention. The unified MP-EM telemetry assembly comprises a landing gap sub 130, a mechanical section 310 and an electronics section 320. The landing gap sub 130 is a tubular body. It has two ends configured with screw threads to connect to the drilling pipe 104. The landing gap sub 130 is separated by a sub insulator 132 into a first part 134 and a second part 136. The insulator 132 generates an insulation zone to electrically separate the first part 134 and the second part 136. The unified MP-EM telemetry assembly further comprises a first connector 322 and a second connector 324. The first connector 322 electronically connects the mechanical section 310 to the first part 134 and the second connector 324 electronically connects the electronics section 320 to the second part 136. The mechanical section 310 and the electronics section 320 are separated by a second insulator 326. The first part 134 and the second part 136 are differentially electrically driven by the MP-EM telemetry assembly 300 to create MP signals or EM signals. The signals are then propagated through the earth to the surface, and received by the receiver 122 at the surface, shown in FIG. 1.

The mechanical section 310 comprises a driving motor 312 and a valve 314. Mud flows through the landing gap sub 130. When a MP signal needs to be transmitted, the controller in the EM telemetry transmitter sends commend to the driving motor 312 to turn the valve 314, momentarily restricting drilling flow to create an MP signal. The MP signal is then transmitted through the first connector 322 and propagated through the earth, and received at the surface.

The electronics section 320 includes an EM telemetry transmitter, such as transmitter 200 as discussed above, which has a power supply, a modulator and a controller that can be integrated in a circuit board. In this embodiment, the controller sends commands to the driving motor 312 and the modulator 240 to control both the mechanical section 310 the electronics section 320. When a EM signal needs to be transmitted, the controller sends commands to the modulator to transmit at least one EM signal by generating a differential voltage across the first part 134 and the second part 136 of the sub via the first connector 322 and the second connectors 324.

The sub insulator 132 and the second insulator 326 in this embodiment are made of electrically non-conductive materials. It could be ceramic, fiberglass or carbon-fiber.

The MP-EM telemetry assembly incorporates the MP mechanical section and EM electronics section in one housing, and uses two connectors to transmit MP and EM signals. Only a single controller and a single power supply are used to control both MP and EM signals to coordinate the MP and EM transmissions. This design provides a compact and shorter assembly compared with the similar product on the market.

Downhole MWD Telemetry Tool

Figure 10:
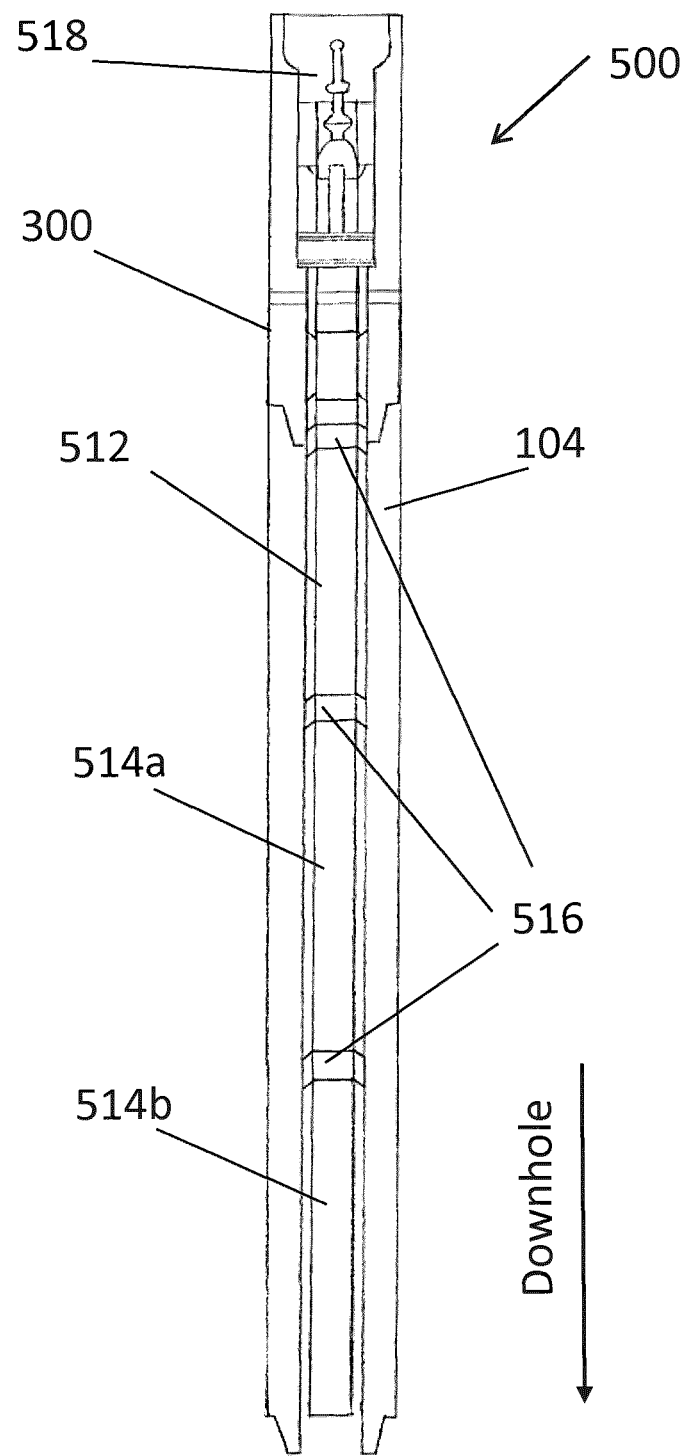
FIG. 10 illustrates an MWD telemetry tool including the MP-EM telemetry unified assembly according to one embodiment of the invention.

FIG. 10 shows a downhole MWD telemetry tool 500 in connection with the drilling pipe 104 according to one embodiment of the invention. The downhole MWD telemetry tool 500 includes the unified MP-EM telemetry assembly 300 shown in FIG. 9, a downhole sensor module 512 and at least one battery module 514, such as two battery modules 514a and 514b. The unified MP and EM telemetry assembly is connected lengthwise to the downhole sensor module 512 and the at least one battery module. In this embodiment, the sensor module 512 and the battery module 514a and 514b are connected by the stabilizers 516.

The downhole MWD telemetry tool 500 may further comprise a spear point 518 connected to the uphole end of the telemetry tool for a wireline retrieval apparatus to attach for retrieval of the telemetry tool without tripping the drill string.

The sensor module 512 includes at least one downhole sensor configured to measure downhole data. In this embodiment, the sensors include accelerometers, magnetometers, gyroscopes, flow switch sensors, vibration and shock sensors, gamma sensors, resistivity sensors, neutron density sensors, pressure sensors and temperature sensors. Other sensors may be used based on the requirement, and are not limited to the sensors above.

Downhole data from the measurement of the sensors may include directional data, geo-data and operating data. The directional data may comprise accelerometer readings, magnetometer readings, tool azimuth, tool inclination, and dip angle. The geo-data may comprise gamma, resistivity and neutron density. The operational data may comprise battery power, battery bus, vibration and shock, temperature, pressure and rotations-per-minute (RPM).

The downhole MWD telemetry tool 500 is configured to transmit selected downhole data determined by a transmission mode pre-configured in the controller of the unified MP-EM telemetry assembly. The transmission mode can be one of MP mode, EM mode, MP-EM redundant mode and MP-EM dependent mode. Under MP mode, all the selected downhole data is transmitted via at least one MP signal. Under EM mode, all the selected downhole data is transmitted via at least one EM signal. Under MP-EM redundant mode, all the selected downhole data is transmitted via both at least one MP signal and at least one EM signal. Under MP-EM dependent mode, error correction codes are transmitted via at least one MP signal while the data is transmitted via at least one EM signal. This increase both transmission speed and signal reliability since more complex error correction codes can be transmitted while maintain high-data throughput on the EM channel. The transmission mode can be reconfigured by a downlink signal transmitted from the surface and received by the telemetry tool at a downhole location. In particular, the downlink signal can be at least one MP signal and/or at least one EM signal measured by the at least one downhole sensor and read by the controller to reconfigure the transmission mode.

Although the embodiment shows a downhole MWD telemetry tool, the technique of this invention can be used in a LWD tool.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on a computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Additionally or alternatively, acts associated with the method described herein can be implemented as operations in appropriate electronic circuitry, such as digital, analog, or both digital and analog circuitry. The circuitry can include baseband electronic components, RF electronic components, logic gates, integrated circuits, etc. It will be readily understood that such circuitry can be configured to perform appropriate actions of the method in response to corresponding inputs.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. An electromagnetic (EM) telemetry transmitter apparatus comprising:
   a power supply;
   a controller;
   a modulator configured to receive direct current (DC) from the power supply and to receive controlling commands from the controller; the modulator further configured to transmit at least one EM signal in response to the controlling commands, the at least one EM signal transmitted through a transmission medium between a surface location and an underground location or between the underground location and another underground location; the modulator comprising:
   a first reactive circuit and a second reactive circuit;
   a first output terminal and a second output terminal for direct or inductive connection to the transmission medium at separate, spaced-apart locations;
   a plurality of switches being controlled by the controller to alternatingly switch the modulator between a first configuration and a second configuration; wherein:
   in the first configuration, an input of the first reactive circuit is at least intermittently connected to the power supply, an output of the first reactive circuit is connected to the first output terminal, and the second output terminal is connected to an electrical return path which bypasses the second reactive circuit; and
   in the second configuration, an input of the second reactive circuit is at least intermittently connected to the power supply, an output of the second reactive circuit is connected to the second output terminal, and the first output terminal is connected to another electrical return path which bypasses the first reactive circuit, wherein each of the first reactive circuit and the second reactive circuit comprises at least one inductor, at least one capacitor; or at least one inductor and at least one capacitor.

2. The EM telemetry transmitter apparatus of claim 1, wherein the plurality of switches comprises a first switch connecting the power supply to the input of the first reactive circuit, a second switch connecting virtual ground to the input of the first reactive circuit, a third switch connecting the output of the first reactive circuit and the first output terminal to virtual ground, a fourth switch connecting the power supply to the input of the second reactive circuit, a fifth switch connecting virtual ground to the input of the second reactive circuit, and a sixth switch connecting the output of the second reactive circuit and second output terminal to virtual ground, each switch having a respective switching duty cycle.

3. The EM telemetry transmitter apparatus of claim 2, wherein the first configuration is configured to complimentarily switch the first switch and the second switch, such that only one of the first switch and the second switch is closed at a time, and optionally the second configuration is configured to complimentarily switch the fourth and the fifth switch, such that only one of the fourth switch and the fifth switch is closed at a time.

4. The EM telemetry transmitter apparatus of claim 3, wherein the at least one EM signal is modulated to at least one modulated signal having a waveform determined by opening and closing operations of the plurality of switches, and optionally the waveform is configured to approximate one or a combination of a sine waveform, a square waveform, a triangle waveform and a sawtooth waveform.

5. The EM telemetry transmitter apparatus of claim 1, wherein the at least one EM signal is modulated according to a modulation scheme, wherein the modulation scheme is one of pulse width modulation (PWM), amplitude-shift keying (ASK), frequency-shift keying (FSK), phase-shift keying (PSK) and quadrature amplitude modulation (QAM).

6. The EM telemetry transmitter apparatus of claim 5, wherein at least two modulation schemes can be multiplexed in one of an amplitude domain, a phase domain and a frequency domain.

7. The EM telemetry transmitter apparatus of claim 1, wherein the power supply further comprises an isolation circuit to galvanically isolate the modulator.

8. A unified mud-pulse (MP)-electromagnetic (EM) telemetry assembly comprising: a sub separated by a first insulator into a first part and a second part; a mechanical section and an electronics section located within the sub and separated by a second insulator; the mechanical section comprising a driving motor and a flow valve, and the electronics section comprising an EM telemetry transmitter apparatus as defined in claim 1; wherein the unified MP-EM telemetry assembly further comprises a first connector and a second connector; the first connector electronically connecting the mechanical section to the first part of the sub and the second connector electronically connecting the electronics section to the second part.

9. A unified MP-EM telemetry assembly of claim 8, wherein the controller sends commands: to the driving motor to transmit at least one MP signal through the first connector by controlling the flow valve to alter flow of drilling fluid or to the modulator to transmit at least one EM signal by generating a differential voltage across the first part and the second part of the sub via the first and second connectors.

10. A unified MP-EM telemetry assembly of claim 8, wherein the first and the second insulator are made of electrically non-conductive materials, preferably, the non-conductive material is one of ceramic, fiberglass and carbon-fiber.

11. A downhole telemetry tool comprising: a unified MP-EM telemetry assembly as defined in claim 8, which is configured to connected to a drilling string; a downhole sensor module including at least one downhole sensor configured to measure downhole data; at least one battery module configured to power the downhole sensor module and the unified telemetry assembly; wherein the unified MP and EM telemetry assembly is connected lengthwise to the downhole sensor module and the at least one battery module.

12. A downhole telemetry tool of claim 11, wherein the downhole telemetry tool is configured to transmit selected downhole data determined by a transmission mode pre-configured in the controller of the unified MP-EM telemetry assembly.

13. A downhole telemetry tool of claim 12, wherein the transmission mode is one of:
  MP mode, wherein all the selected downhole data is transmitted via at least one MP signal; EM mode, wherein all the selected downhole data is transmitted via at least on EM signal;
  MP-EM redundant mode, wherein all the selected downhole data is transmitted via both at least one MP signal and at least one EM signal;
  MP-EM dependent mode, wherein part of the selected downhole data is transmitted via at least one MP signal and the other part of the selected downhole data is transmitted via at least one EM signal.

14. A downhole telemetry tool of claim 13, wherein the transmission mode can be reconfigured by a downlink signal transmitted from the surface and received by the telemetry tool at a downhole location.

15. A downhole telemetry tool of claim 14, wherein the downlink signal comprises at least one MP signal and/or at least one EM signal measured by the at least one downhole sensor and read by the controller to reconfigure the transmission mode.

16. A downhole telemetry tool of claim 11, wherein the at least one downhole sensors comprises at least one of accelerometers, magnetometers, gyroscopes, vibration and shock sensors, gamma sensors, resistivity sensors, neutron density sensors, porosity sensor, pressure sensors and temperature sensors.

17. A downhole telemetry tool of claim 16, wherein the downhole data comprises directional data, geo-data and operational data.

18. A downhole telemetry tool of claim 17, wherein the directional data comprises accelerometer readings, magnetometer readings, azimuth, inclination, and dip angle; the geo-data comprises gamma, resistivity and neutron density; and the operational data comprises battery power, battery bus, vibration and shock, temperature, pressure and rotations-per-minute (RPM).

19. A downhole telemetry tool of claim 11 further comprises a spear point connected to an uphole end of the telemetry tool for a retrieval apparatus to attach for retrieval of the telemetry tool.

* * * * *